US011618706B2

(12) United States Patent
Hoshiba

(10) Patent No.: US 11,618,706 B2
(45) Date of Patent: Apr. 4, 2023

(54) SLEEVE FOR GLASS TUBE MOLDING

(71) Applicant: NIPPON ELECTRIC GLASS CO., LTD., Otsu (JP)

(72) Inventor: Kenichi Hoshiba, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 469 days.

(21) Appl. No.: 16/060,232

(22) PCT Filed: Oct. 14, 2016

(86) PCT No.: PCT/JP2016/080592
§ 371 (c)(1),
(2) Date: Jun. 7, 2018

(87) PCT Pub. No.: WO2017/098806
PCT Pub. Date: Jun. 15, 2017

(65) Prior Publication Data
US 2018/0362384 A1 Dec. 20, 2018

(30) Foreign Application Priority Data
Dec. 10, 2015 (JP) ............................ JP2015-241629

(51) Int. Cl.
*C03B 17/04* (2006.01)
*C03B 17/02* (2006.01)

(52) U.S. Cl.
CPC ............ *C03B 17/04* (2013.01); *C03B 17/025* (2013.01)

(58) Field of Classification Search
CPC .......... C03B 17/00–025; C03B 23/045; C03B 23/025; C03B 23/04; C23C 30/005
See application file for complete search history.

(56) References Cited

U.S. PATENT DOCUMENTS 972,614 A * 10/1910 Frink ........................ C03B 9/41 65/161
2,150,017 A * 3/1939 Barnard ................ C03B 37/085 65/181

(Continued)

FOREIGN PATENT DOCUMENTS

DE 102008006015 A1 7/2009
EP 0831068 A2 3/1998

(Continued)

OTHER PUBLICATIONS

JP 05301728 machine translation as provided by https://www.j-platpat.inpit.go.jp/p0200 (Year: 1993).*

(Continued)

*Primary Examiner* — Jodi C Franklin
(74) *Attorney, Agent, or Firm* — Cantor Colburn LLP

(57) ABSTRACT

Provided is a sleeve for glass tube molding capable of suppressing generation of foreign matter such as rust from a sleeve shaft and suppressing adhesion of foreign matter such as rust to the molten glass without degrading mechanical strength of the sleeve shaft. A sleeve for glass tube molding includes a sleeve shaft including a through-hole and a refractory cylindrical body inserted coaxially with the sleeve shaft around the sleeve shaft. A superior rust-resistant material having rust resistance superior to that of the sleeve shaft is provided to cover a part or whole of an inner surface of the through-hole of the sleeve shaft and to cover a tip of the sleeve shaft.

4 Claims, 3 Drawing Sheets

1
A
Down stream ↔ Up stream
G
10
30
40
50
20
10a
30a

(56) References Cited

U.S. PATENT DOCUMENTS 2,464,028 A * 3/1949 Danner .................. C03B 17/04 65/187
3,937,623 A * 2/1976 Kononko ................ C03B 25/10 65/192
4,023,953 A 5/1977 Megles, Jr. et al.
4,078,909 A 3/1978 Dietzsch et al.
4,147,513 A * 4/1979 Bienkowski ......... G01N 27/122 324/71.1
4,236,138 A * 11/1980 Segawa .................. G01N 27/12 338/229
4,260,978 A * 4/1981 Yasuda .................. G01N 27/12 338/34
4,415,878 A * 11/1983 Novak .............. G01N 27/4067 338/34
5,061,034 A * 10/1991 Fujikawa ............. G02B 6/2558 385/95
6,223,583 B1 * 5/2001 Friese .................. G01N 27/407 123/672
6,408,680 B2 * 6/2002 Friese ................ G01N 27/4077 73/23.31
6,546,783 B2 * 4/2003 Shirai ...................... C03C 8/24 204/424
6,595,029 B1 * 7/2003 Dick ..................... C03C 17/004 65/DIG. 9
6,658,916 B2 * 12/2003 Donelon .............. G01N 27/407 204/424
6,851,280 B2 * 2/2005 Ott .......................... H01J 9/247 65/29.15
7,244,480 B2 * 7/2007 Minaai .................. E06B 3/6612 52/786.13
7,254,984 B2 * 8/2007 Weyl ...................... G01K 13/02 204/424
8,336,336 B2 * 12/2012 Singer ..................... C03B 17/04 65/352
8,464,554 B2 * 6/2013 Fredholm ............... C03B 17/04 65/89
8,910,527 B2 * 12/2014 Habersetzer .......... G01F 1/3272 73/861.01
9,016,324 B2 * 4/2015 Niccolls .................. B32B 27/12 138/99
11,014,844 B2 * 5/2021 Wada ...................... C03B 17/04
2001/0055930 A1 * 12/2001 Ott .......................... C03C 3/095 65/59.27
2002/0178753 A1 * 12/2002 Dick ....................... C03B 7/084 65/180
2004/0067369 A1 * 4/2004 Ott .......................... C03B 40/00 428/432
2008/0127680 A1 * 6/2008 Morrill ................... B29C 48/92 65/277
2011/0113829 A1 * 5/2011 Leber ...................... C03B 17/04 65/87
2011/0126976 A1 * 6/2011 Kikutani ................... C03C 8/24 156/285
2016/0046517 A1 * 2/2016 Kass ....................... C03B 19/02 65/86

FOREIGN PATENT DOCUMENTS

JP S3925566 B1 11/1964
JP S4029817 Y1 10/1965
JP 01150819 A * 6/1989
JP H05301728 A 11/1993
JP 07172852 A * 7/1995 ............. C03B 33/06
JP 08259251 A * 10/1996 ............. C03C 3/321
JP 09328324 A * 12/1997 ............. C03B 17/04
JP H09328324 A 12/1997
JP 11180724 A * 7/1999 ............. C03B 17/04
JP 11322350 A * 11/1999 ............. C03B 17/04
JP H11322350 A 11/1999
JP 2003048736 A * 2/2003 ........... C03B 23/099
JP 2003054972 A * 2/2003 ........... C03B 23/207
JP 2007031205 A * 2/2007 ........... C03B 11/127
JP 2008266082 A 11/2008
JP 2017105678 A * 6/2017 ........... C23C 28/321

OTHER PUBLICATIONS

Extended European Search Report corresponding to Application No. 16872706.3-1105/3388394 PCT/JP2016080592; dated Jul. 4, 2019.

PCT IPRP corresponding to Application No. PCT/JP2016/080592; Dated Jun. 12, 2018.

PCT Written Opinion of the ISA corresponding to Application No. PCT/JP2016/080592; dated Jan. 10, 2017.

International Search Report corresponding to Application No. PCT/JP2016/080592; dated Jan. 10, 2017.

* cited by examiner

SLEEVE FOR GLASS TUBE MOLDING

CROSS REFERENCE TO RELATED APPLICATIONS

This is the U.S. national stage of application No. PCT/JP2016/080592, filed on Oct. 14, 2016. Priority under 35 U.S.C. § 119(a) and 35 U.S.C. § 365(b) is claimed from Japanese Application No. 2015-241629, filed on Dec. 10, 2015, the disclosures all of which are also incorporated herein by reference.

TECHNICAL FIELD

The present invention relates to a technique of a sleeve for glass tube molding used in the Danner process.

BACKGROUND ART

Conventionally, the Danner process has been widely used as a method for producing a glass tube and a glass rod in quantity.

In the Danner process, molten glass flows down on a sleeve, which is supported with a tip inclined downward and rotated about an axial center, and the flowed-down molten glass is wound around an outer circumferential surface of the sleeve, the molten glass is drawn while blow air is jetted (or not jetted) from the tip of the sleeve glass, thereby continuously molding the glass tube or the glass rod.

The sleeve used in the Danner process is mainly constructed with a sleeve shaft that is supported with the tip inclined downward and a tip support (metal tip), a refractory cylindrical body, a rear support, and the like, which are coaxially inserted in order on the sleeve shaft (for example, see Patent Document 1). The sleeve shaft is generally made of a steel material such as heat-resistant steel having high mechanical strength, and includes a through-hole (inner hole in Patent Document 1) in the center in order to guide blow air to the tip of the sleeve.

PRIOR ART DOCUMENTS

Patent Document

Patent Document 1: JP-A 11-322350

SUMMARY OF THE INVENTION

Problems to be Solved by the Invention

As described above, when the glass tube is continuously molded by the Danner process, a foreign matter called a black dot is sometimes mixed in the glass tube.

The foreign matter is caused by rust generated from the steel material constituting the sleeve shaft. More particularly, when the molten glass is wound around the sleeve to mold the glass tube or the glass rod, the steel material constituting the sleeve shaft is exposed to a high-temperature state, and the through-hole of the sleeve shaft is oxidized by the blow air. As a result, the rust is generated at the tip of the sleeve shaft and in an inner surface of the through-hole of the sleeve shaft, peeled from the through-hole of the sleeve shaft by the blow air, carried to the tip of the sleeve shaft, and adheres to the molten glass drawn out from the tip of the sleeve.

Therefore, there is a demand for a configuration that suppresses the rust generated from the sleeve shaft from adhering to the molten glass.

In order to suppress the generation of the rust, it is conceivable to form the sleeve shaft using a superior rust-resistant steel material. However, the mechanical strength is decreased when the rust resistance of the steel material is improved, which the sleeve shaft may be damaged or deformed when the glass tube or the glass rod is molded.

The present invention has been made to solve the problem described above and an object of the present invention is to provide a sleeve for glass tube molding capable of suppressing the generation of the foreign matter from the sleeve shaft and suppressing the foreign matter such as the rust from adhering to the molten glass without degrading mechanical strength of the sleeve shaft.

Solutions to the Problems

The problem to be solved by the present invention is as described above, and means for solving the problem will be described below.

According to one aspect of the present invention, a sleeve for glass tube molding includes a sleeve shaft including a through-hole and a refractory cylindrical body inserted coaxially with the sleeve shaft around the sleeve shaft. A superior rust-resistant material having rust resistance superior to that of the sleeve shaft is provided to cover a part or whole of an inner surface of the through-hole of the sleeve shaft and to cover a tip of the sleeve shaft.

As used herein, the "superior rust-resistant material" means a material in which the rust is not generated on a surface of the material when the material is exposed to air at 1000° C. for 150 hours.

The sleeve for glass tube molding of the present invention has a structure in which the tip of the sleeve shaft, or the part or whole of the inner surface of the through-hole of the sleeve shaft is covered with the superior rust-resistant material having rust resistance superior to that of the sleeve shaft. Consequently, the blow air does not come into direct contact with the tip of the sleeve shaft, or the part or whole of the inner surface of the through-hole of the sleeve shaft, the foreign matter such as the rust can be suppressed from being generated from the sleeve shaft, and the foreign matter such as rust generated from the sleeve shaft can be suppressed from adhering to the molten glass.

In the sleeve for glass tube molding having the configuration, even if the sleeve shaft is not formed using a steel material having superior rust resistance but poor mechanical strength, the foreign matter such as the rust is suppressed from being generated from the sleeve shaft, so that the mechanical strength of the sleeve shaft can be maintained.

In the sleeve for glass tube molding of the present invention, the superior rust-resistant material is preferably provided to form a pipe member having a flange at one end, and the flange covers the tip of the sleeve shaft while the part or whole of the inner surface of the through-hole of the sleeve shaft is covered by inserting the pipe member into the through-hole of the sleeve shaft.

In the sleeve for glass tube molding having the above configuration, the pipe member made of the superior material having rust resistance superior to that of the sleeve shaft is inserted into the through-hole of the sleeve shaft to cover the tip of the sleeve shaft or the surface of the through-hole. Consequently the blow air does not come into direct contact with the tip of the sleeve shaft and the surface of the through-hole, the foreign matter such as the rust can be suppressed from being generated from the sleeve shaft, and the foreign matter such as the rust generated from the sleeve shaft can be suppressed from adhering to the molten glass.

In the sleeve for glass tube molding of the present invention, a seal made of molten glass is preferably interposed between a tip surface of the sleeve shaft and the flange of the pipe member.

In the sleeve for glass tube molding having the above configuration, because the gap is prevented from being formed between the tip surface of the sleeve shaft and the flange of the pipe member, even if the foreign matter such as the rust is generated in the inner surface of the through-hole of the sleeve shaft, the foreign matter such as the rust can be confined between the inner surface of the through-hole of the sleeve shaft and an outer surface of the pipe member by the seal made of the molten glass, and suppressed from diffusing out of the sleeve shaft.

Thus, the foreign matter such as the rust, which is generated from the sleeve shaft, can more securely be suppressed from adhering to the molten glass.

In the sleeve for glass tube molding of the present invention, an outer diameter of the flange is preferably larger than an outer diameter of the tip of the sleeve shaft.

In the sleeve for glass tube molding having the above configuration, the whole of the tip of the sleeve shaft can securely be covered.

Thus, the foreign matter such as the rust, which is generated from the sleeve shaft, can more securely be suppressed from adhering to the molten glass.

Effects of the Invention

The effect of the present invention is obtained as follows.

That is, in the sleeve for glass tube molding of the present invention, the foreign matter such as the rust, which is generated from the sleeve shaft, can be suppressed from adhering to the molten glass without degrading the mechanical strength of the sleeve shaft.

BRIEF DESCRIPTION OF THE DRAWINGS

FIG. 3A is a sectional side view illustrating a state in which the pipe member is disposed on a downstream side of the sleeve shaft, FIG. 3B is a sectional side view illustrating a state when molten glass is flowed down onto the sleeve and supplied to the tip of the sleeve, FIG. 3C is a sectional side view illustrating a state when the pipe member is inserted into a through-hole of the sleeve shaft, and FIG. 3D is a sectional side view illustrating a state in which the glass seal is formed between a tip surface of the sleeve shaft and a flange of the pipe member.

EMBODIMENT OF THE INVENTION

An embodiment of the present invention will be described below with reference to FIGS. 1, FIG. 2, and FIG. 3A to FIG. 3D.

In the following description, for convenience, a direction of an arrow A in FIGS. 1 to FIG. 3D is defined as a drawing direction (conveying direction) of molten glass G.

In the following description, for convenience, a vertical direction in FIGS. 1 to FIG. 3D is defined as a vertical direction of a sleeve 1 for glass tube molding.

[Sleeve 1 for Glass Tube Molding]

Figure 1:
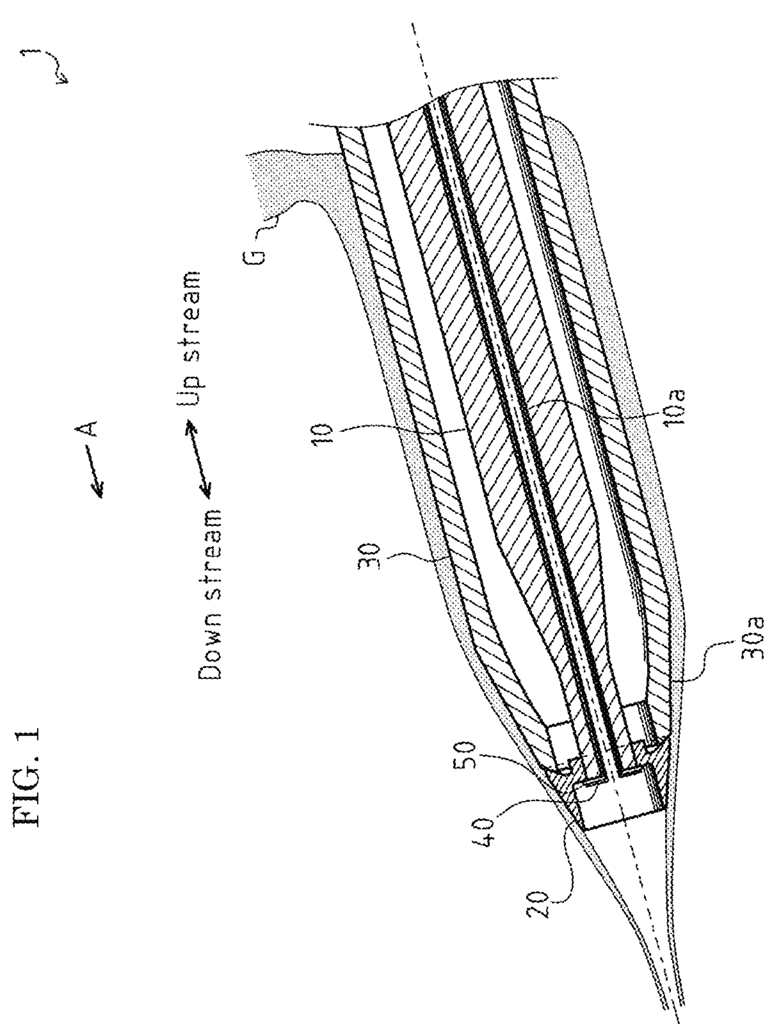
FIG. 1 is a sectional side view illustrating a configuration of a sleeve for glass tube molding according to an embodiment of the present invention.
Figure 2:
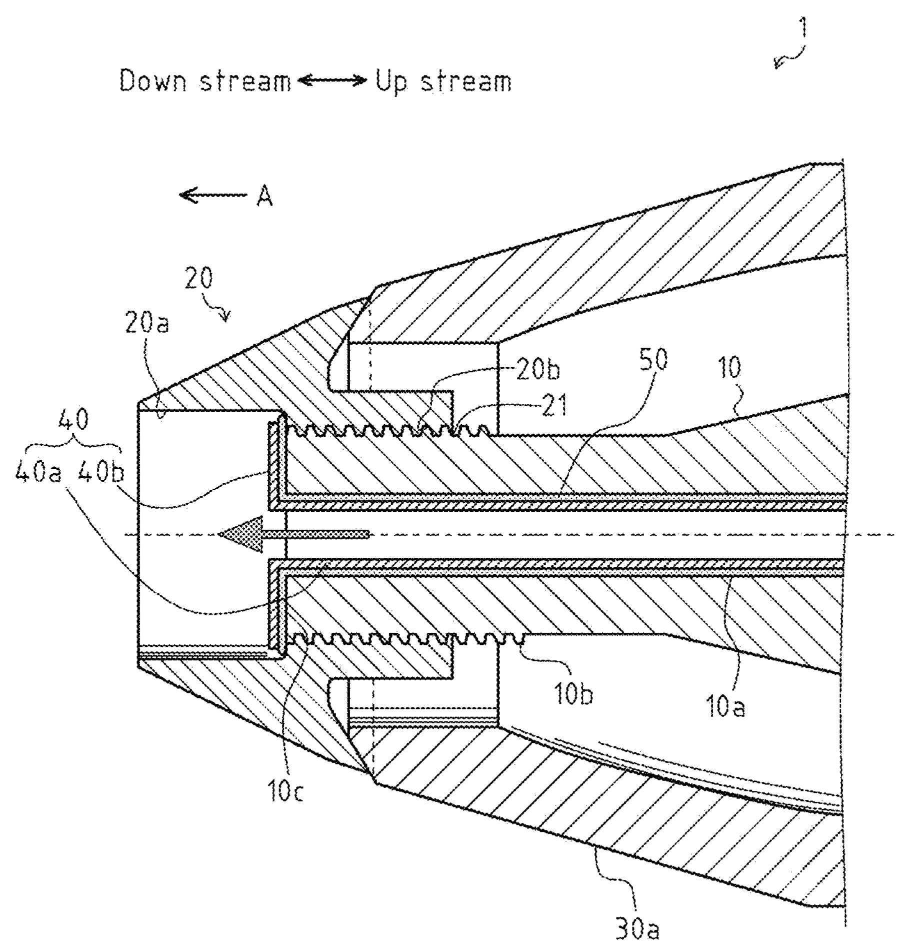
FIG. 2 is an enlarged sectional side view illustrating a vicinity of a tip of the sleeve for glass tube molding.

An entire configuration of the sleeve 1 for glass tube molding (hereinafter, simply referred to as a "sleeve 1") embodying the present invention will be described with reference to FIG. 1 and FIG. 2.

For example, the sleeve 1 according to the embodiment is used to produce a glass tube or a glass rod in quantity by the Danner process.

The sleeve 1 is mainly constructed with a sleeve shaft 10, a metal tip 20, a refractory cylindrical body 30, a superior rust-resistant material 40, a glass seal 50, and a holding metal fitting (not illustrated).

The sleeve shaft 10 is a base of the sleeve 1.

The sleeve shaft 10 is constructed with an elongated hollow round rod member made of heat-resistant steel, such as an Fe—Co—Ni type alloy and an Fe—Cr—Ni type alloy, which has high mechanical strength, and a through-hole 10*a* that has a circular section and constitutes an inner circumference of the sleeve shaft 10 is coaxially drilled in the sleeve shaft 10.

That is, the sleeve shaft 10 includes the through-hole 10*a* in the center thereof. A tip surface 10*c* that is an annular flat surface is provided at a tip of the sleeve shaft 10.

The sleeve shaft 10 is disposed in an attitude in which one end (the end on the drawing direction side (the direction side indicated by the arrow A in FIG. 1) of the molten glass G) is inclined downwardly, and detachably supported by a rotation driving device (not illustrated) at the other end.

The sleeve shaft 10 of the embodiment includes the tip surface 10*c* that is the annular flat surface, but the tip surface 10*c* is not particularly limited to the flat surface.

For example, the tip of the sleeve shaft 10 may have a curved surface shape or a shape having irregularities.

The metal tip 20 will be described below.

The metal tip 20 is an example of a metal tip constituting the tip of the sleeve 1, and holds the refractory cylindrical body 30 while the refractory cylindrical body 30 is sandwiched between the metal tip 20 and the holding metal fitting (to be described later).

The metal tip 20 is formed into a truncated conical shape and made of heat-resistant steel such as an Fe—Co—Ni type alloy or a Fe—Cr—Ni type alloy. At the tip of the sleeve shaft 10, the metal tip 20 is provided so as to be coaxially with the sleeve shaft 10, and such that a sectional area of the metal tip 20 decreases gradually toward a drawing side of the molten glass G (hereinafter, referred to as a "downstream side").

A recess 20*a* having a circular sectional shape is coaxially formed at an end on the downstream side of the metal tip 20.

A through-hole 21 having a circular sectional shape is coaxially drilled in an end surface on an opposite side (hereinafter, referred to as an "upstream side") to the downstream side of the recess 20*a*.

A female screw 20*b* is coaxially threaded in the through-hole 21.

A male screw 10*b* is threaded on the tip of the sleeve shaft 10.

The metal tip 20 is coaxially screwed to the tip of the sleeve shaft 10 while the male screw 10*b* and the female screw 20*b* are interposed therebetween.

Consequently, the metal tip 20 is fixed to the tip of the sleeve shaft 10.

The refractory cylindrical body 30 will be described below.

The refractory cylindrical body 30 gradually conveys the molten glass G guided to the sleeve 1 onto the downstream side while winding the molten glass G on an outer circumferential surface of the refractory cylindrical body 30.

The refractory cylindrical body 30 is constructed with an elongated round rod hollow member made of a refractory material such as a silica-alumina base refractory material and a silica-alumina-zirconia base refractory material, and a tapered portion 30*a* in which a sectional area decreases gradually is formed at one end of the refractory cylindrical body 30.

A platinum film or a platinum-alloy film having a film thickness of, for example, 250 μm to 450 μm is coated on the outer circumferential surface of the refractory cylindrical body 30.

On the upstream side of the metal tip 20, the refractory cylindrical body 30 is inserted coaxially with the sleeve shaft 10 around the sleeve shaft 10 while the tapered portion 30*a* is directed toward the downstream side.

As a result, the metal tip 20 is disposed on one end side (downstream side) of the refractory cylindrical body 30, and the tapered portion 30*a* of the refractory cylindrical body 30 and the tapered shape of the outer circumferential surface of the metal tip 20 are smoothly connected at the end on the downstream side of the whole sleeve 1.

The metal tip 20 regulates movement of the refractory cylindrical body 30 to the downstream side (the tip side of the sleeve shaft 10) in an axial center direction.

[Superior Rust-Resistant Material 40]

The superior rust-resistant material 40 will be described below.

The superior rust-resistant material 40 is made of a material in which rust is not generated on the surface of the material when the material is exposed to air at 1000° C. for 150 hours. Heat-resistant steel, such as an Fe—Cr—Ni type alloy, which has superior rust resistance (is resistant to rust) can be used as the superior rust-resistant material 40.

The superior rust-resistant material 40 covers a part or a whole of an inner surface of the through-hole 10*a* of the sleeve shaft 10, and covers the tip surface 10*c* of the sleeve shaft 10. In the case that the inner surface of the through-hole 10*a* is covered with the superior rust-resistant material 40, it is preferable to cover the whole of the inner surface of the through-hole 10*a* rather than only the part of the inner surface. This is because generation of a foreign matter such as rust from the sleeve shaft can be suppressed more effectively.

As to a method for covering the inner surface of the through-hole 10*a* of the sleeve shaft 10 and the tip surface 10*c* of the sleeve shaft 10, the superior rust-resistant material 40 may be thermally sprayed on these portions, or a pipe member including a flange at one end may be formed using the superior rust-resistant material 40 and the pipe member formed may be inserted in the through-hole 10*a* of the sleeve shaft 10.

The case that the pipe member (hereinafter, the pipe member is designated by the reference sign 40) made of the superior rust-resistant material 40 is inserted in the through-hole 10*a* of the sleeve shaft 10 will be described below.

The configuration of the pipe member 40 will be described with reference to FIGS. 1 to FIG. 3D.

The pipe member 40 is an elongated member made of heat-resistant steel, such as an Fe—Cr—Ni type alloy, which has superior rust resistance (is resistant to rust), and the pipe member 40 includes a main body 40*a* having a cylindrical shape and a flange 40*b* provided at one end (tip) of an outer circumferential surface of the main body 40*a* as illustrated in FIG. 2 and FIGS. 3A to FIG. 3D.

The main body 40*a* is a cylindrical portion in which an outer diameter of the main body 40*a* is slightly smaller than a diameter of the through-hole 10*a* of the sleeve shaft 10.

The main body 40*a* is used to allow blow air to flow through the tip of the sleeve shaft 10.

The main body 40*a* is inserted into the through-hole 10*a* of the sleeve shaft 10, thereby covering the inner surface of the through-hole 10*a*.

The other end of the main body 40*a* is disposed so as to protrude from an insertion hole (not illustrated) of the holding metal fitting disposed on the upstream side of the refractory cylindrical body 30.

The main body 40*a* is communicated with a blow air supply device (not illustrated) through a piping member or the like at an upstream end.

Consequently, the blow air can be supplied to the tip of the sleeve shaft 10 through the main body 40*a* of the pipe member 40 by driving the blow air supply device.

The flange 40*b* is an annular portion protruding outward from an outer circumferential edge of a downstream end (tip) of the main body 40*a*.

The flange 40*b* is a portion that covers the tip surface 10*c* of the sleeve shaft 10 with the glass seal 50 interposed therebetween when the pipe member 40 is inserted into the through-hole 10*a* of the sleeve shaft 10 and attached to the sleeve shaft 10.

The outer diameter of the flange 40*b* is slightly larger than the outer diameter of the tip surface 10*c* of the sleeve shaft 10, and the flange 40*b* covers the whole of the tip surface 10*c*.

In the pipe member 40, the main body 40*a* is inserted into the through-hole 10*a* of the sleeve shaft 10, the other end of the pipe member 40 is inserted in the insertion hole of the holding metal fitting, the other end protrudes from the holding metal fitting, and the flange 40*b* that is one end is disposed while facing the tip surface 10*c* of the sleeve shaft 10.

Although details will be described later, the pipe member 40 is provided coaxially with the sleeve shaft 10 while a space between the tip surface 10*c* of the sleeve shaft 10 and an opposing surface of the flange 40*b* to the tip surface 10*c* is sealed by the glass seal 50.

The pipe member 40 includes a biasing unit (not illustrated) at the other end of the pipe member 40.

At this point, the biasing unit biases the pipe member 40 toward the upstream side in the axial center direction.

The biasing unit includes a biasing member in which one end is connected to a base end of the sleeve shaft 10 while the other end is connected to the other end of the pipe member 40.

The biasing member is a member that biases the pipe member 40 toward the upstream side.

For example, the biasing member is constructed with a known compression coil spring.

Thus, the pipe member 40 is always pulled toward the base end side of the sleeve shaft 10 by the biasing unit.

Although the pipe member 40 of the embodiment includes the biasing unit, the pipe member 40 is not limited thereto. The pipe member 40 may not include the biasing unit.

Although details will be described later, the glass seal 50 is a seal portion, which is made of molten glass G and interposed between the tip surface 10*c* of the sleeve shaft 10 and the flange 40*b* of the pipe member 40.

The glass seal 50 is formed of the same glass material as the glass tube manufactured using the sleeve 1 for glass tube molding.

Although details will be described later, the glass seal 50 is formed by filling a gap between the pipe member 40 and the sleeve shaft 10 with the molten glass G when the pipe member 40 is attached to the through-hole 10*a* of the sleeve shaft 10.

At the tip of the sleeve shaft 10, the glass seal 50 is interposed between the tip surface 10*c* of the sleeve shaft 10 and the opposing surface of the flange 40*b* to the tip surface 10*c*, and protrudes outward in a radial direction of the flange 40*b*.

In the sleeve 1 of the embodiment, the glass seal 50 is provided between the tip surface 10*c* of the sleeve shaft 10 and the flange 40*b*, but the sleeve 1 is not limited thereto. For example, the glass seal 50 may also be provided between the inner surface of the through-hole 10*a* of the sleeve shaft 10 and the outer circumferential surface of the main body 40*a* of the pipe member 40. The glass seal 50 may not be provided between the tip surface 10*c* of the sleeve shaft 10 and the flange 40*b*, and between the inner surface of the through-hole 10*a* of the sleeve shaft 10 and the outer circumferential surface of the main body 40*a* of the pipe member 40.

In the case that the glass seal 50 is not included, an inner wall surface of the sleeve shaft 10 abuts on the outer circumferential surface of the main body 40*a* of the pipe member 40, and the tip surface 10*c* of the sleeve shaft 10 abuts on the opposing surface of the flange 40*b* to the tip surface 10*c*.

The holding metal fitting will be described below.

The holding metal fitting holds the refractory cylindrical body 30 while the refractory cylindrical body 30 is sandwiched between the holding metal fitting and the metal tip 20.

The holding metal fitting is made of heat-resistant steel such as an Fe—Co—Ni type alloy and a Fe—Cr—Ni type alloy, and an insertion hole is made in the holding metal fitting in order to insert the other end of the sleeve shaft 10 to protrude to the outside.

On the other end side (upstream side) of the refractory cylindrical body 30, the holding metal fitting is inserted coaxially and slidably into the sleeve shaft 10, and abuts on the end of the refractory cylindrical body 30.

As described above, the sleeve 1 of the embodiment is constructed with the sleeve shaft 10, the pipe member 40, the glass seal 50, and the metal tip 20, the refractory cylindrical body 30, the holding metal fitting, and the like. The metal tip 20, the refractory cylindrical body 30, the holding metal fitting, and the like are coaxially provided from the downstream side toward the upstream side in order on the sleeve shaft 10.

The pipe member 40 is provided such that the other end of the pipe member 40 protrudes from the insertion hole of the holding metal fitting while the main body 40*a* is inserted into the through-hole 10*a* of the sleeve shaft 10 through the glass seal 50, the pipe member 40 is provided so as to be slidable in the axial center direction with respect to the sleeve shaft 10, and the pipe member 40 is always biased toward the upstream side by the biasing unit provided at the other end of the pipe member 40.

Consequently, the opposing surface of the flange 40*b* of the pipe member 40 to the sleeve shaft 10 is adjacent to the tip surface 10*c* of the sleeve shaft 10 while the pipe member 40 is always inserted into the through-hole 10*a* of the sleeve shaft 10 through the glass seal 50 by biasing force of the biasing unit.

As a result, even if the glass seal 50 is softened by heat while the space between the sleeve shaft 10 and the pipe member 40 is sealed by the glass seal 50, the sleeve shaft 10 and the pipe member 40 come into close contact with each other with the glass seal 50 interposed therebetween, so that the generation of the gap between the sleeve shaft 10 and the pipe member 40 can be suppressed.

The sleeve 1 having the above configuration is rotated about the axial center, and the molten glass G flows down on the sleeve 1 rotated (more specifically, the refractory cylindrical body 30), the flowed-down molten glass G is wound around the outer circumferential surface of the sleeve 1, and the molten glass G is drawn while the blow air is jetted out from the tip of the sleeve 1 (more specifically, the recess 20*a* of the metal tip 20), thereby continuously molding the glass tube or the glass rod.

[Method for Forming Glass Seal]

A method of forming the glass seal 50 between the sleeve shaft 10 and the pipe member 40 will be described below with reference to FIGS. 3A to FIG. 3D.

Figure 3A:
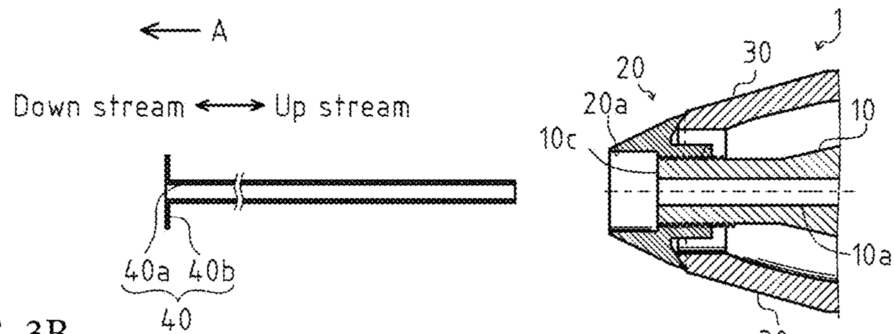
FIGS. 3A to FIG. 3D are views illustrating a state when a pipe member is assembled in a sleeve shaft with a glass seal interposed therebetween over time.

As illustrated in FIG. 3A, the pipe member 40 is disposed at a predetermined position on the downstream side of the sleeve shaft 10.

The molten glass G flows down onto the sleeve 1 while the pipe member 40 is not assembled in the sleeve shaft 10. Then, the sleeve 1 is rotated.

Figure 3B:
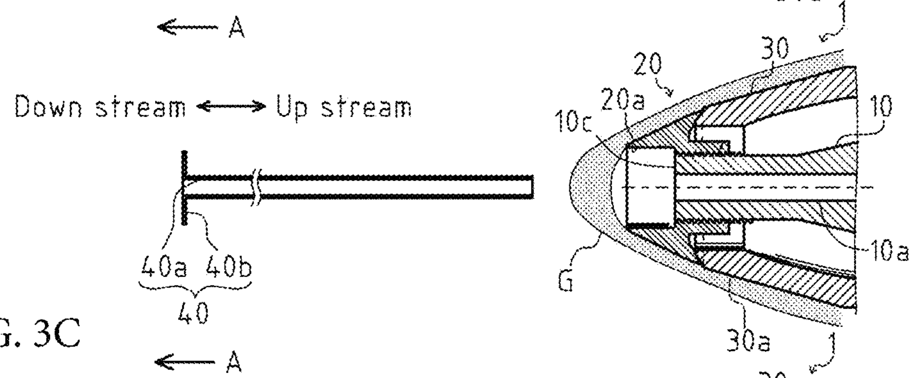
Figure 3C:
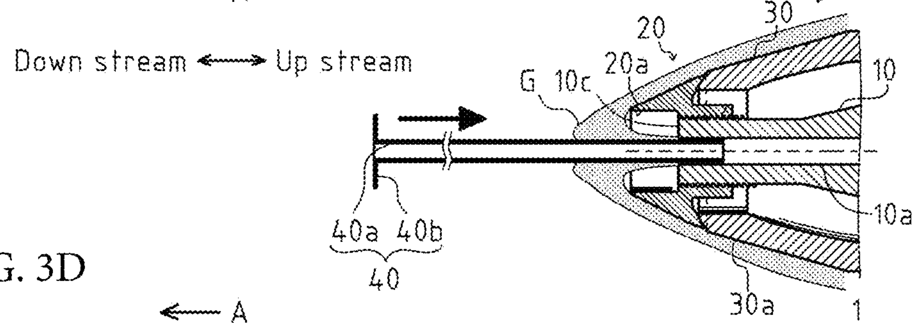

The molten glass G gradually flows down onto the downstream side (tip side) of the sleeve 1, and flows by a predetermined amount as illustrated in FIG. 3B. Then the pipe member 40 is inserted into the through-hole 10*a* of the sleeve shaft 10 from the tip side of the sleeve shaft 10 as illustrated in FIG. 3C.

At this point, the molten glass G is supplied between the flange 40*b* of the pipe member 40 and the tip surface 10*c* of the sleeve shaft 10, and extends so as to spread throughout.

Figure 3D:
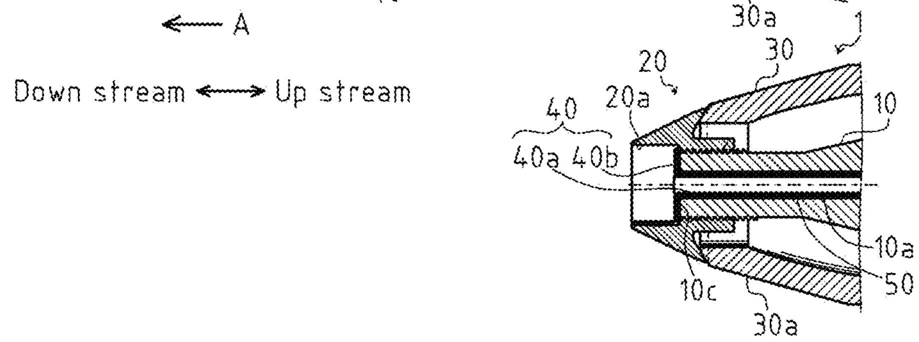

As illustrated in FIG. 3D, the gap between the tip surface 10*c* of the sleeve shaft 10 and the flange 40*b* of the pipe member 40 is filled with the molten glass G without forming the gap, thereby forming the glass seal 50.

After the glass seal 50 is formed, the biasing unit (not illustrated) is attached to the upstream side (base end side) of the pipe member 40.

Consequently, the pipe member 40 is biased onto the upstream side by the biasing force of the biasing unit.

In FIG. 3A and FIG. 3B, the pipe member 40 is disposed at a predetermined position on the downstream side of the sleeve shaft 10, but the pipe member 40 is not limited thereto.

For example, the pipe member 40 may be disposed in the state (the state of the pipe member 40 in FIG. 3C) in which a part of the upstream side of the pipe member 40 is inserted into the through-hole 10*a*. Then, the pipe member 40 is completely inserted into the through-hole 10*a* while the molten glass G flows down as illustrated in FIG. 3C, whereby the glass seal 50 can be formed.

As described above, in the sleeve 1 of the embodiment, by inserting the pipe member 40 into the through-hole 10*a* of the sleeve shaft 10, the pipe member 40 covers a part or whole of the inner surface of the through-hole 10*a*, and the flange 40*b* of the pipe member 40 covers the tip surface 10*c* of the sleeve shaft 10.

Consequently, the generation of the foreign matter such as rust from the sleeve shaft 10 can be prevented, and adhesion of the foreign matter such as rust to the molten glass G can be suppressed.

In the configuration of the sleeve 1 of the embodiment, the glass seal 50 is interposed between the tip surface 10*c* of the sleeve shaft 10 and the flange 40*b* of the pipe member 40.

This enables the prevention of the generation of the gap between the tip surface 10*c* of the sleeve shaft 10 and the flange 40*b* of the pipe member 40. Even if the rust is generated in the inner surface of the through-hole 10*a* of the sleeve shaft 10, the rust can be confined between the inner surface of the through-hole 10*a* of the sleeve shaft 10 and the outer surface of the main body 40*a* of the pipe member 40 by the glass seal 50, and suppressed from diffusing out of the sleeve shaft 10.

Thus, the foreign matter, such as the rust, which is generated from the sleeve shaft 10, can more securely be suppressed from adhering to the molten glass G.

In the configuration of the sleeve 1 of the embodiment, the outer diameter of the flange 40*b* of the pipe member 40 is larger than the outer diameter of the tip surface 10*c* of the sleeve shaft 10.

In the sleeve 1 having the above configuration, the entire tip surface 10*c* of the sleeve shaft 10 can securely be covered by the flange 40*b*.

Thus, the foreign matter, such as the rust, which is generated from the sleeve shaft, can more securely be suppressed from adhering to the molten glass G.

INDUSTRIAL APPLICABILITY

The sleeve for glass tube molding of the present invention can be used as a technique of a sleeve that guides the molten glass to the downstream side while winding the molten glass around the outer circumferential surface in the Danner process adopted for the mass production of the glass tube or glass rod, for example.

DESCRIPTION OF REFERENCE SIGNS

1: Sleeve for glass tube molding
10: Sleeve shaft
10*a*: Through-hole
30: Refractory cylindrical body
40: Pipe member (superior rust-resistant material)
40*b*: Flange
50: Glass seal

The invention claimed is:

1. A sleeve for glass tube molding comprising:
a sleeve shaft including a through-hole;
a refractory cylindrical body inserted coaxially with the sleeve shaft around the sleeve shaft;
a pipe member including a superior rust-resistant material having rust resistance superior to that of the sleeve shaft, covering a part or whole of an inner surface of the through-hole of the sleeve shaft, and including a flange at one end covering a tip of the sleeve shaft; and
a glass seal including a glass material, interposed between a tip surface of the sleeve shaft and the flange of the pipe member, directly contacting the tip surface and the flange, and further protruding outward than the flange in a radial direction of the flange.

2. The sleeve for glass tube molding according to claim 1, the flange covers the tip of the sleeve shaft while the part or whole of the inner surface of the through-hole of the sleeve shaft is covered by inserting the pipe member into the through-hole of the sleeve shaft.

3. The sleeve for glass tube molding according to claim 2, wherein an outer diameter of the flange is larger than an outer diameter of the tip of the sleeve shaft.

4. The sleeve for glass tube molding according to claim 1, wherein an outer diameter of the flange is larger than an outer diameter of the tip of the sleeve shaft.

* * * * *